United States Patent
Weber et al.

(10) Patent No.: US 11,124,272 B2
(45) Date of Patent: Sep. 21, 2021

(54) SYSTEM AND METHOD FOR VIBRATION CANCELLATION

(71) Applicant: STEERING SOLUTIONS IP HOLDING CORPORATION, Saginaw, MI (US)

(72) Inventors: John E. Weber, Pinconning, MI (US); Benjamin H. Helmreich, Bay City, MI (US); Brian G. Maust, Unionville, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 137 days.

(21) Appl. No.: 16/679,591

(22) Filed: Nov. 11, 2019

(65) Prior Publication Data
US 2021/0139107 A1    May 13, 2021

(51) Int. Cl.
  *F16F 15/22*    (2006.01)
  *B63B 17/00*    (2006.01)
  *F16F 15/02*    (2006.01)

(52) U.S. Cl.
  CPC .......... *B63B 17/0081* (2013.01); *F16F 15/02* (2013.01); *F16F 15/22* (2013.01)

(58) Field of Classification Search
  CPC ..... B63B 17/0081; F16F 15/02; F16F 15/022; F16F 15/22
  See application file for complete search history.

(56) References Cited

U.S. PATENT DOCUMENTS

| | | | |
|---|---|---|---|
| 4,887,699 A * | 12/1989 | Ivers | B60G 17/018 188/378 |
| 6,763,774 B1 | 7/2004 | Ranieri et al. | |
| 6,786,172 B1 * | 9/2004 | Loffler | B63B 17/0081 114/363 |
| 7,039,512 B2 * | 5/2006 | Swinbanks | B63B 17/0081 248/550 |
| H2229 H * | 2/2009 | Reason | 114/363 |
| 7,726,452 B2 * | 6/2010 | Kraner | F16F 7/1017 188/378 |
| 8,261,684 B2 * | 9/2012 | Werner | B63B 17/0081 114/363 |
| 8,473,163 B2 * | 6/2013 | Hiemenz | F16F 15/02 701/45 |
| 9,291,300 B2 * | 3/2016 | Parker | B60N 2/506 |
| 9,488,247 B2 * | 11/2016 | Rijnveld | F16F 15/02 |
| 2004/0024503 A1 | 2/2004 | Swinbanks et al. | |
| 2021/0129719 A1* | 5/2021 | Helmreich | B60N 2/501 |

FOREIGN PATENT DOCUMENTS

| | | | | |
|---|---|---|---|---|
| CA | 2975911 A1 * | 9/2016 | ......... | B63B 17/0081 |
| JP | 55076787 A * | 6/1980 | | |

\* cited by examiner

*Primary Examiner* — Adam D Rogers
(74) *Attorney, Agent, or Firm* — Dickinson Wright PLLC

(57) ABSTRACT

A method for cancelling vibration includes receiving, from a first accelerometer, a first accelerometer measurement; receiving, from a second accelerometer, a second accelerometer measurement; determining a counter torque value based on the first accelerometer measurement and the second accelerometer measurement; and selectively controlling a lift mechanism according to the counter torque value using a motor, the motor being in mechanical communication with the lift mechanism and the lift mechanism being configured to allow a platform to travel in one of a first direction and a second direction.

20 Claims, 5 Drawing Sheets

SYSTEM AND METHOD FOR VIBRATION CANCELLATION

TECHNICAL FIELD

This disclosure relates to vehicles and in particular to systems and methods for vibration cancellation in vehicles.

BACKGROUND

Vehicles, such as cars, trucks, sport utility vehicles, crossovers, mini-vans, ride on industrial equipment (e.g., floor scrubbers, floor sweepers, forklifts, commercial lawnmowers, and the like), boats, airplanes, helicopters, and/or other suitable vehicles typically include a seat for an operator to sit on while operating the vehicle. Additionally, boats and other watercraft vehicles typically provide a helm deck comprising relatively stiff fiberglass. The operator of such a watercraft vehicle typically stands on the helm deck when operating the steering mechanism of the watercraft vehicle. During operation of the watercraft vehicle, the operator may experience various vibrations while seated or standing on the helm deck, resulting from various forces acting on the watercraft vehicle.

Typically, such watercraft vehicles includes various strain reduction components adapted to reduce strain on the operator, which may allow the operator to operate the vehicle for longer periods. The various strain reduction components of the vehicle may include air bladders, mechanical shock, and the like for reducing or eliminating the perception by the operator of vibrations while seated. Further, typical watercraft vehicles include a passive damping system, such as a foam pad, disposed on the helm deck to reduce the perception by the operator of vibrations while standing on the helm deck. The various strain reduction components of the vehicle may be adapted to isolate the operator from the various vibrations experienced while operating the watercraft vehicle.

SUMMARY

This disclosure relates generally to vehicle vibration cancellation.

An aspect of the disclosed embodiments includes a system for cancelling helm deck vibration, the helm deck including a helm pad disposed in a portion of a helm deck between a helm seat and a helm. The system includes a motor in mechanical communication with a lift mechanism, the lift mechanism being configured to allow the helm pad to travel in a direction perpendicular to the helm deck. The system also includes a processor and a memory. The memory includes instructions that, when executed by the processor, cause the processor to: receive, from a first accelerometer, a first accelerometer measurement; receive, from a second accelerometer, a second accelerometer measurement; determine a counter torque value based on the first accelerometer measurement and the second accelerometer measurement; and selectively control the lift mechanism according to the counter torque value using the motor.

Another aspect of the disclosed embodiments includes a method for cancelling vibration. The method includes receiving, from a first accelerometer, a first accelerometer measurement; receiving, from a second accelerometer, a second accelerometer measurement; determining a counter torque value based on the first accelerometer measurement and the second accelerometer measurement; and selectively controlling a lift mechanism according to the counter torque value using a motor, the motor being in mechanical communication with the lift mechanism and the lift mechanism being configured to allow a platform to travel in a first direction and a second direction.

Another aspect of the disclosed embodiments includes a helm deck apparatus. The apparatus includes a helm pad disposed in a portion of a helm deck between a helm seat and a helm. The apparatus also includes a brushless servo motor in mechanical communication with a lift mechanism, the lift mechanism being configured to allow the helm pad to travel in a direction perpendicular to the helm deck. The apparatus also includes a first accelerometer disposed on the helm pad and configured to measure acceleration of the helm pad and a second accelerometer disposed on a vessel hull associated with the helm pad configured to measure acceleration of the vessel hull. The apparatus also includes a controller configured to: receive, from the first accelerometer, a first accelerometer measurement; receive, from the second accelerometer, a second accelerometer measurement; determine a counter torque value based on the first accelerometer measurement and the second accelerometer measurement; and selectively control the lift mechanism according to the counter torque value using the brushless servo motor.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
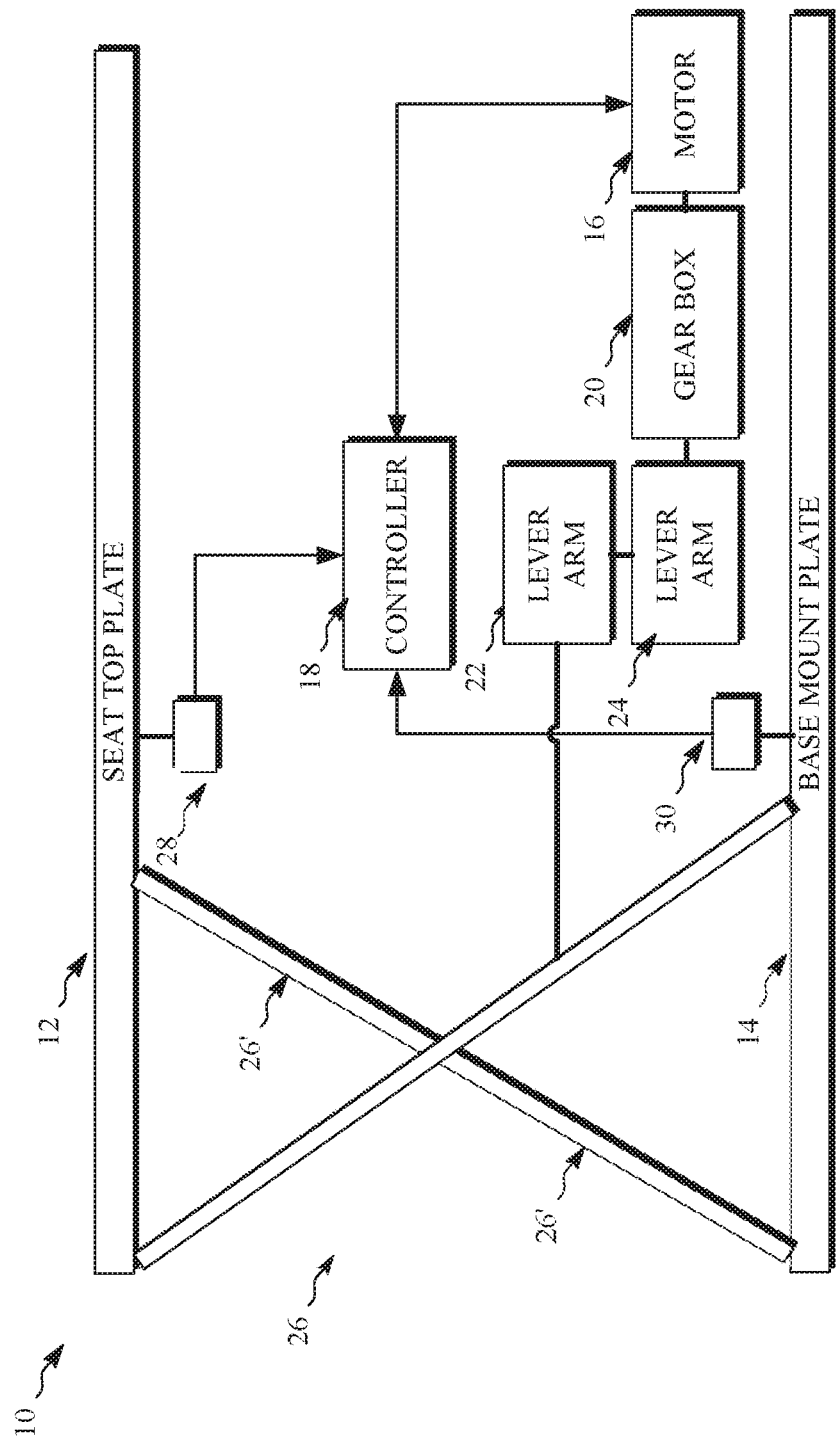
FIG. 1 generally illustrates a vibration cancellation system according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, ride on industrial equipment (e.g., floor scrubbers, floor sweepers, forklifts, commercial lawnmowers, and the like), boats, airplanes, helicopters, and/or other suitable vehicles typically include a seat for an operator to sit on while operating the vehicle. Additionally, boats and other watercraft vehicles typically provide a helm deck that the operator stands on while operating the helm (e.g., a steering mechanism) of the watercraft vehicle. During operation of the watercraft vehicle, the operator may experience various vibrations while seated or standing on the helm deck, resulting from various forces acting on the watercraft vehicle.

Typically, such watercraft vehicles includes various strain reduction components adapted to reduce strain on the operator, which may allow the operator to operate the vehicle for longer periods. The various strain reduction components of the vehicle may include air bladders, mechanical shock, and the like for reducing or eliminating the perception by the operator of vibrations while seated in a seat of the watercraft vehicle. Further, typical watercraft vehicles include a passive damping system, such as a foam pad, disposed on the helm deck to reduce the perception by the operator of vibrations while standing on the helm deck. The various strain reduction components of the vehicle may be adapted to isolate the operator from the various vibrations experienced while operating the watercraft vehicle.

However, the helm deck of such typical watercraft vehicles is typically constructed of stuff fiberglass composite material. Such a helm deck typical does not provide compliance to the operator when standing on the helm deck. For example, when the operator is operating the watercraft vehicle at speed in rough or choppy sears, the forces from the watercraft vehicle hitting the uneven water are transmitted through the hull of the watercraft vehicle to the helm deck and, ultimately, to the operator. Such forces cause the operator to suffer considerable jolts and impacts and may cause fatigue relatively quickly. The typical strain reduction components used in such watercraft vehicles may not provide an active vibration cancellation, may not provide significant shock absorbing characteristics, and may increase manufacturing costs of typical vehicles.

Accordingly, the systems and methods described herein may be configured to provide a built-in helm deck (e.g., a platform) at a helm station of a watercraft vehicle. The helm deck may be adapted to hold one or two riders. In some embodiments, the helm deck may be supported and may be capable of stroking lower into the deck a distance (e.g., a first travel limit) and capable of stroking above the deck a distance (e.g., a second travel limit). In some embodiments, the up and down stroking may be in a direction opposite of a motion of the watercraft vehicle along an axis that is perpendicular to the deck of the watercraft vehicle. In some embodiments, the systems and methods described herein may be configured to move the helm deck relatively quickly in order to reduce or eliminate the perception by the operator of the vibration, jolts, and/or shocks imposed on the operator.

In some embodiments, the systems and methods described herein may be configured to provide a relatively simple passive damping system coupled with an active damping system. In some embodiments, as the watercraft vehicle travels through water, a controller may drive an actuator to move the helm pad in an appropriate direction to reduce or eliminate the forces generated by the movement. The systems and methods described herein may be configured to actively monitor and adjust the movement of the helm pad in order to provide a smooth ride for the operation and/or others standing on the helm pad.

In some embodiments, the systems and methods, such as those described herein, that are configured to provide both passive and active vibration cancellation, may be desirable.

The systems and methods described herein may be configured to sense floor acceleration of a portion of the vehicle floor disposed proximate or beneath a seat. The systems and methods described herein may be configured to determine and provide cancellation forces to a seat top plate of the seat to control movement of the seat, prior to vibrations and other forces acting on the seat.

In some embodiments, the systems and methods described herein may be configured to provide an operator interface. The operator interface may include a selectable switch (e.g., such as a three position selector switch or other suitable selectable switch), a digital interface switch (e.g., such as on a display of the vehicle or other suitable display), or other suitable operator interface. In some embodiments, the systems and methods described herein may be configured to receive, from the operator interface, an operator preference (e.g., based on an operator selection). The operator preference may indicate a preferred operating mode. The operator modes may include a comfort mode, a medium mode, a firm mode, or other suitable mode. The systems and methods described herein may be configured to adjust the cancellation force provided to the seat top plate based on the operator preference (e.g., to provide a ride firmness selected by the operator).

In some embodiments, the systems and methods described herein may be configured to receive, a first accelerometer, a first accelerometer measurement. The systems and methods described herein may be configured to receive, from a second accelerometer, a second accelerometer measurement. The systems and methods described herein may be configured to determine a counter torque value based on the first accelerometer measurement and the second accelerometer measurement. The systems and methods described herein may be configured to selectively control a lift mechanism according to the counter torque value using a motor, the motor being in mechanical communication with the lift mechanism and the lift mechanism being configured to allow a helm pad to travel in a direction perpendicular to a helm deck.

In some embodiments of the systems and methods described herein, the motor may include a brushless servo motor or other suitable motor. In some embodiments of the systems and methods described herein, the first accelerometer may be disposed on the helm pad. In some embodiments of the systems and methods described herein, the second accelerometer may be disposed on a hull of the watercraft vehicle. In some embodiments of the systems and methods described herein, the lift mechanism may be adapted to apply a force corresponding to the counter torque value on the helm pad. In some embodiments, the systems and methods described herein may be configured to selectively adjust the counter torque value based on an operator preference. In some embodiments of the systems and methods described herein, the operator preference corresponds to a desired operating style of an operator.

FIG. 1 generally illustrates a vibration cancelation system 10 according to the principles of the present disclosure. The system 10 may be associated with a seat. The seat and/or the system 10 may be disposed with in a watercraft vehicle, such as those described herein. The system 10 may include a seat top plate 12 and a base mount plate 14. The seat top plate 12 may be configured to engage a bottom or lower portion of the seat. The base mount plate 14 may be configured to secure the system 10 and the seat to a portion of a floor of the watercraft vehicle.

The system 10 may include a motor 16 disposed on the base mount plate 14. It should be understood that the motor 16 may be disposed in any suitable location besides the base mount plate 14. The motor 16 may include any suitable motor. For example, the motor 16 may include a brushless servo motor or other suitable motor. The system 10 includes a controller 18. The controller 18 may be configured to selectively control the motor 16. For example, the controller 18, as will be described, may be configured to determine various torque values. The controller 18 may control the motor 16 using the determined torque values. For example, the controller 18 may instruct the motor 16 to turn at a speed corresponding to a determined torque value. The motor 16 may move in response to the instructions from the controller 18.

The motor 16 may be in mechanical communication with a gear box 20. The gear box 20 may include any suitable gear box, such as a worm gear box or other suitable gear box. As the motor 16 turns in response to the instructions from the controller 18, the gears within the gear box 20 actuate. The gear box 20 may include a plurality of gears having any suitable gear ratio. The gear box 20 may be configured to reduce rotational speed and increase torque provided by the motor 16. As the gears of the gear box 20 are actuated, a link arm 22 connected to the gear box 20 via lever arm 24 moves, which may cause a lift mechanism 26 to actuate.

The lift mechanism 26 may include one or more control arms 26'. In some embodiments, the control arms 26' may be arranged such that the lift mechanism 26 includes a scissor lift mechanism, however, the lift mechanism 26 may include any suitable lift mechanism. As the link arm 22 moves, the control arms 26' of the lift mechanism 26 apply a force on the seat top plate 12. The force applied by the control arms 26' of the lift mechanism 26 on the seat top plate 12 corresponds to the determined torque applied to the motor 16 by the controller 18.

In some embodiments, the system 10 includes an accelerometer 28 disposed on the seat top plate 12 and an accelerometer 30 disposed on the base mount plate 14. While only the accelerometer 28 and the accelerometer 30 are described, the system 10 may include any suitable number of accelerators, including fewer or additional accelerometers or sensors than those described herein. The accelerometer 28 and the accelerometer 30 may include any suitable accelerometer. The accelerometer 28 and the accelerometer 30 may be configured to measure acceleration forces acting on the seat top plate 12 and the base mount plate 14, respectively.

Figure 2:
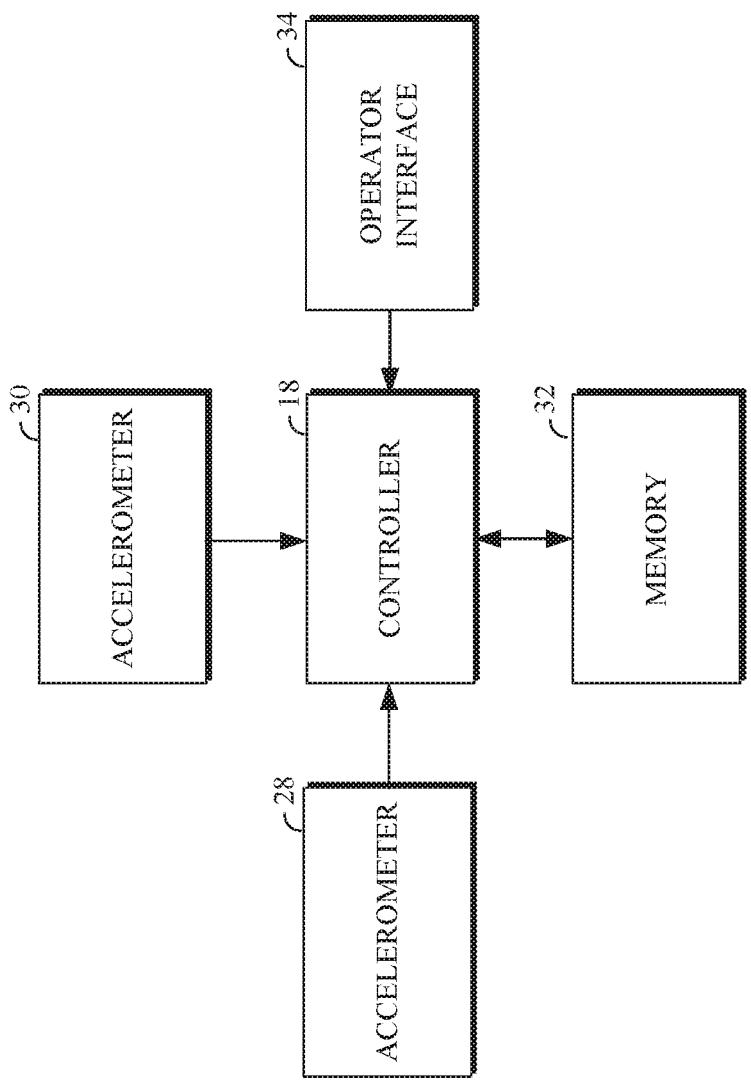
FIG. 2 generally illustrates vibration cancellation controller system according to the principles of the present disclosure.

As described, the system 10 includes the controller 18. The controller 18 may include any suitable controller or processor, such as those described herein. The controller 18 may be configured to executed instructions stored on a memory, such as the memory 32, as is generally illustrated in FIG. 2. The memory 32 may comprise a single disk or a plurality of disks (e.g., hard drives), and includes a storage management module that manages one or more partitions within the memory 32. In some embodiments, memory 32 may include flash memory, semiconductor (solid state) memory or the like. The memory 32 may include Random Access Memory (RAM), a Read-Only Memory (ROM), or a combination thereof.

The instructions stored on the memory 32, when executed by the controller 18, cause the controller 18 to, at least, control or cancel the perception by the operator of vibrations acting on the seat of the watercraft vehicle. For example, the controller 18 receives a first accelerometer measurement from the accelerometer 28 and a second accelerometer measurement from the accelerometer 30. The accelerometer measurements represent forces currently acting on the seat top plate 12 and the base mount plate 14, respectively.

The controller 18 may be configured to determine a counter torque value based on the first accelerometer measurement and the second accelerometer measurement. The counter torque value corresponds to a torque value that, when the controller 18 controls the motor 16 using the counter torque value, generates a force that is opposite and same or substantially the same in magnitude as the vibrations acting on the seat top plate 12.

As described, the controller 18 controls the motor 16 according to the counter torque value. As the motor 16 turns according to the counter torque value, the gears of the gear box 20 actuate causing the link arm 22 to move. The control arms 26' move or actuate in response to the link arm 22 moving, which causes the lift mechanism 26 to exert a force that is opposite the vibrations acting on the seat top plate 12, which may reduce or cancel the perception by the operator of vibrations acting on the seat top plate 12. The controller 18 may determine the counter torque value based on a sum of the first accelerometer measurement and the second accelerometer measurement.

In some embodiments, the controller 18 may be in communication with an operator interface 34. The operator interface 34 may include any suitable interface. For example, the operator interface 34 may include a selectable switch (e.g., such as a three position selector switch or other suitable selectable switch), a digital interface switch (e.g., such as on a display of the watercraft vehicle, on a mobile device display, or other suitable display), or other suitable operator interface. The controller 18 may be configured to receive, an operator preference from the operator interface 34.

The operator preference may indicate a preferred operating mode. For example, the operator of the watercraft vehicle may select a preferred or desired operating mode using the operator interface 34. The operator modes may include a comfort mode, a medium mode, a firm mode, or other suitable mode. The controller 18 may selectively adjust the counter torque value based on the operator preference. For example, the controller 18 may increase or decrease the counter torque value to provide more or less vibration cancellation based on the operator preference (e.g., to provide a riding experience through vibration cancellation that corresponds to the operator preference.

In some embodiments, the controller 18 may be configured to selectively adjust the counter torque value based on a motor position and a motor speed of the motor 16 in order to control or eliminate a harsh mechanical end stop impact on the seat (e.g., via the seat top plate 12). For example, the controller 18 may determine a motor position of the motor 16. The controller 18 may receive a motor position from a position sensor, or other suitable sensor, disposed proximate the motor 16 and configured to determine a motor position of the motor 16. The controller 18 may determine a motor speed of the motor 16. For example, the controller 18 may receive a motor speed from a velocity sensor, or other suitable sensor, disposed proximate the motor 16 and configured to determine a motor speed of the motor 16.

In some embodiments, the controller 18 converts the motor position into a normalized seat displacement value corresponding to a displacement of the seat range from −100% to +100%. The controller 18 determines a sum of the motor position and the motor speed. The controller 18 determines a torque value and/or selectively adjusts the counter torque value based on the sum of the motor position and the motor speed. The controller 18 controls the motor 16 using the determined torque value or the adjusted counter torque value to reduce or eliminate harsh mechanical end stop impact on the seat top plate 12.

In some embodiments, the controller 18 continues to monitor accelerometer measurements, motor position, and/or motor speed in order to provide continuous reduction or elimination of the perception by the operator of the vibrations acting on the seat via the seat top plate 12.

Figure 4:
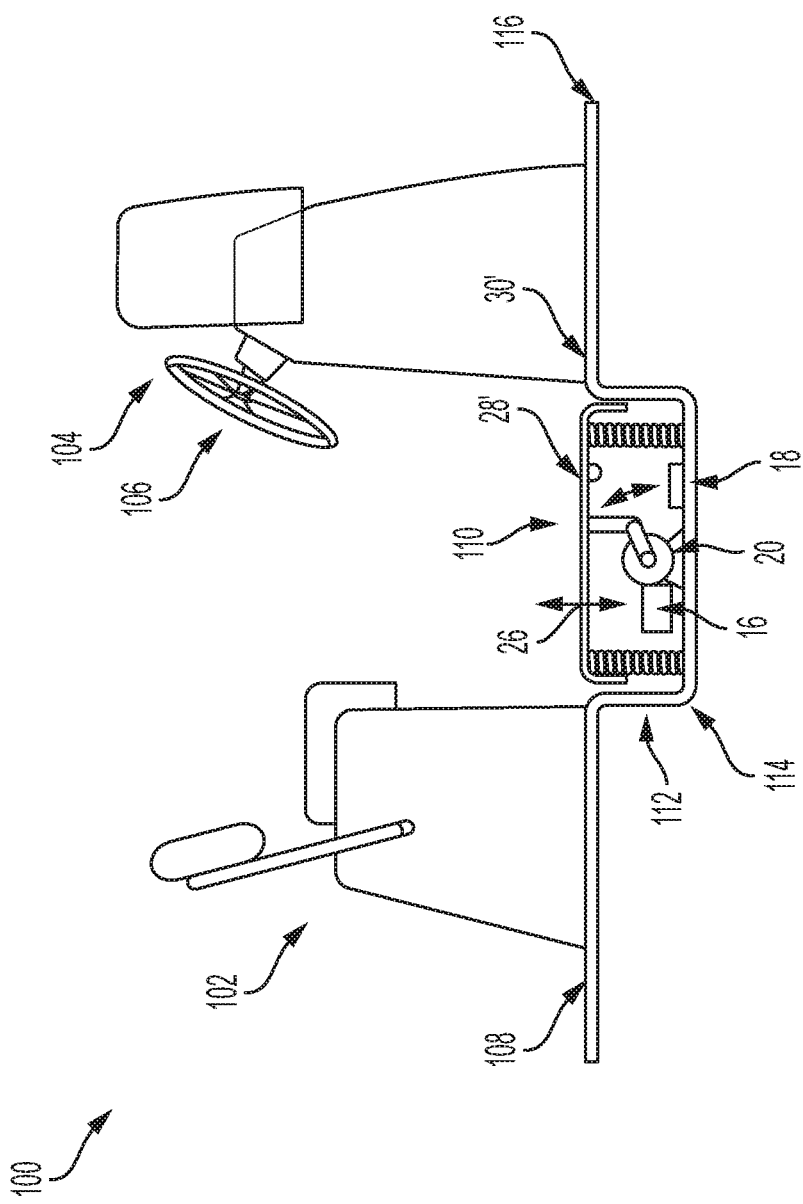
FIG. 4 generally illustrates a helm station according to the principles of the present disclosure.

In some embodiments, the watercraft vehicle may include a helm station 100 as is generally illustrated in FIG. 4. The helm station may include a helm seat 102 and a helm 104. The helm seat 102 may include the system 10, as described. The helm 104 includes a steering mechanism 106. The steering mechanism may include any suitable steering mechanism, such as a steering wheel or other suitable steering mechanism. The operator of the watercraft vehicle may operating the watercraft vehicle using, at least, the steering mechanism, while seated in the helm seat or standing on a helm deck 108. The helm deck 108 may comprise a fiberglass composite material or other suitable material.

In some embodiments, the helm station 100 includes a helm pad 110. The helm pad 110 may comprise a material similar or different from the helm deck 108. In some embodiments, a top portion of the helm pad 110 may include a foam pad or other suitable material adapted to provide comfort to the operator while standing on the helm pad 110. The helm station 100 includes a well 112. The well 112 is disposed beneath the helm deck 108. The helm pad 110 may be adapted to fit in the well 112 and be flush with the helm deck 108 in a resting position, as will be described.

In some embodiments, the helm station 100 includes the system 10 disposed within the well 112 beneath the helm pad 110. For example, the motor 16, the controller 18, the gear box 20, the link arm 22, and the lift mechanism 26 may be disposed in the well 112 beneath the helm pad 110. In some embodiments, the controller 18 may be disposed in the helm 104. In some embodiments, a single controller 18 may control the system 10 disposed beneath the helm seat 102 and the system 10 disposed in the well 112.

The system 10 may be configured to selectively control movement of the helm pad 110 in order to reduce or eliminate the perception of vibrations (e.g., and other shocks or jolts) by the operator while standing on the helm pad 110. The lift mechanism 26 may include the control arms 26', as described, and may include a scissor lift. In some embodiments, the lift mechanism 26 may include posts, slides, and/or other suitable mechanisms configured to support and control movement of the helm pad 110.

In some embodiments, the controller 18 is configured to determine a counter torque value to be applied (e.g., using the motor 16) to the helm pad 110, such that, the forces acting on the watercraft that the operator perceives while standing on the helm pad 110 are reduced or eliminated. For example, the helm station 100 may include an accelerometer 28' disposed on the helm pad 110. The accelerometer 28' may include features similar to the accelerometer 28, as described. The accelerometer 28' may be configured to measure acceleration of the helm pad 110. The helm station 100 may include an accelerometer 30'. The accelerometer 30' may include features similar to those of the accelerometer 30. The accelerometer 30' may be disposed on a fix portion of a hull 116 of the watercraft vehicle and may be configured to measure acceleration of the hull 116. In some embodiments the accelerometer may be disposed on a fixed portion of the well.

The controller 18 may receive a first acceleration measurement from the accelerometer 28' and a second acceleration measurement from the accelerometer 30'. The controller 18 may determine a counter torque value based on the first accelerometer measurement and the second accelerometer measurement, as described. The controller 18 may selectively control the motor 16 according to the counter torque value. As the motor 16 turns in response to the counter torque value, the gears of the gear box 20 actuate, which causes the link 22 to move the lift mechanism 26.

The lift mechanism 26 may be coupled to or in mechanical communication with the helm pad 110. As the lift mechanism 26 moves, the lift mechanism 26 applies a force, corresponding to the counter toque value, on the helm pad 110, which causes the helm pad 110 to move. Movement of the helm pad 110 by the lift mechanism 26 reduces or eliminates the perception by the operation of the vibrations acting on the helm pad 110. The helm pad 110 may travel between a first distance into the well (e.g., a first or lower travel limit) and a second distance extending above the helm deck 108 (e.g., a second or upper travel limit), in response to movement by the lift mechanism 26.

In some embodiments, the controller 18 may receive the operator preference from the operator interface 34, as described. The operator interface 34 may be disposed on the helm 104 or on a suitable display, as described. The operator preference may indicate the preferred operating mode for the helm pad 110. For example, the operator of the watercraft vehicle may select a preferred or desired operating mode using the operator interface 34. The operator modes may include a comfort mode, a medium mode, a firm mode, or other suitable mode. The controller 18 may selectively adjust the counter torque value based on the operator preference. For example, the controller 18 may increase or decrease the counter torque value to provide more or less vibration cancellation based on the operator preference (e.g., to provide a standing experience through vibration cancellation that corresponds to the operator preference).

In some embodiments, the helm station 100 includes one or more passive damping mechanisms 114. The passive damping mechanisms 114 may extend between a bottom side of the helm pad 110 (e.g., facing the well 112) and a surface of the well 112 (e.g., facing the helm pad 110). The passive damping mechanisms 114 may include springs, air bladders, other suitable passive damping mechanisms, or a combination thereof. The passive damping mechanisms 114 may be configured to support the helm pad 110, such that the helm pad 110 is flush with the helm deck 108 when the helm pad 110 is at rest (e.g., the lift mechanism 26 is not acting on the helm pad 110). Additionally, or alternatively, the passive damping mechanisms 114 may provide passive damping to the helm pad 110 in response to various forces acting on the watercraft vehicle.

While only a helm pad 110 is described, the system 10 may be configured to reduce or eliminate vibrations acting on any suitable platform, such as a platform of a shipping container, a platform disposed in a floor of a train car, a platform disposed in a floor of an airplane, a platform disposed in a floor of a bus, or any other suitable platform. Additionally, or alternatively, one of more of the accelerators 28' and 30' may disposed on a corresponding platform.

In some embodiments, the controller 18 may perform the methods described herein. However, the methods described herein as performed by controller 18 are not meant to be limiting, and any type of software executed on a controller can perform the methods described herein without departing from the scope of this disclosure. For example, a controller, such as a processor executing software within a computing device, can perform the methods described herein.

Figure 3:
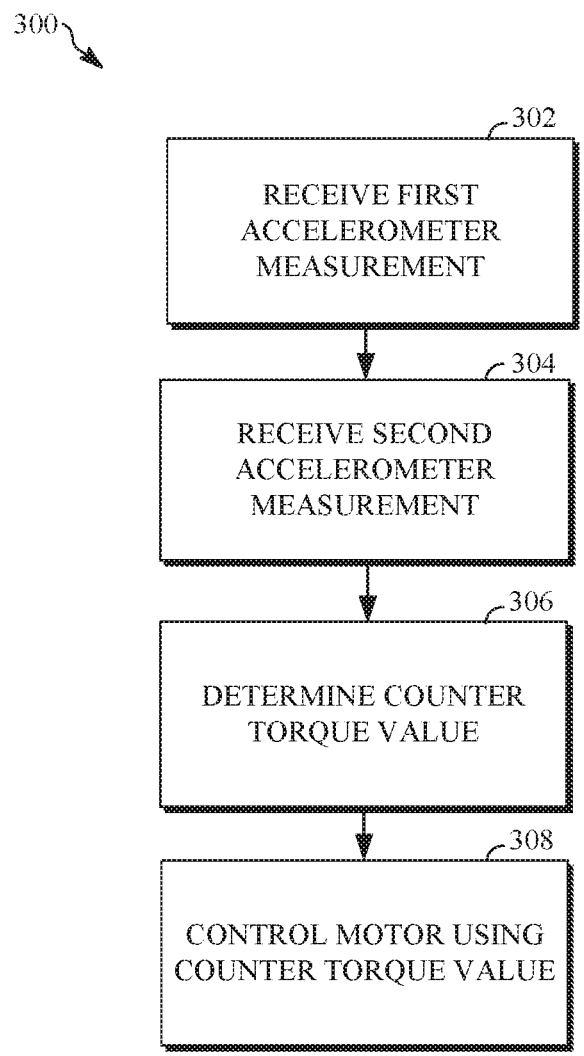
FIG. 3 is a flow diagram generally illustrating a seat vibration cancellation method according to the principles of the present disclosure.

FIG. 3 is a flow diagram generally illustrating a seat vibration cancellation method 300 according to the principles of the present disclosure. At 302, the method 300, receives a first accelerometer measurement. For example, the controller 18 may receive the first accelerometer measurement from one of the accelerometer 28 and the accelerometer 30. At 304, the method 300 receives a second accelerometer measurement. For example, the controller 18 may receive the second accelerometer measurement from the other of the accelerometer 28 and the accelerometer 30.

At 306, the method 300 determines a counter torque value. For example, the controller 18 may determine the counter torque value based on the first accelerometer measurement and the second accelerometer measurement. In some embodiments, the controller 18 determines the counter torque value based on the motor position and the motor speed of the motor 16. In some embodiments, the controller 18 may determine a counter torque value based on the first accelerometer measurement and the second accelerometer measurement and may adjust the counter torque value based on the motor position and motor speed. In some embodiments, the controller 18 receives the operator preference, as described. The controller 18 may adjust the counter torque value or any determined torque value based on the operator preference.

At 308, the method 300 controls the motor using the counter torque value. For example, the controller 18 controls the motor 16 using the counter torque value. As the motor 16 turns in response to the counter torque value, the gears of the gear box 20 actuate, which drives the lever arm 24 causing the link arm 22 to move. The movement of the link arm 22 drives the lift mechanism 26, which applies a force, corresponding to the counter torque value, on the seat top plate 12. The force applied on the seat top plate 12 may reduce or eliminate the perception by the operator of the vibrations acting on the seat.

Figure 5:
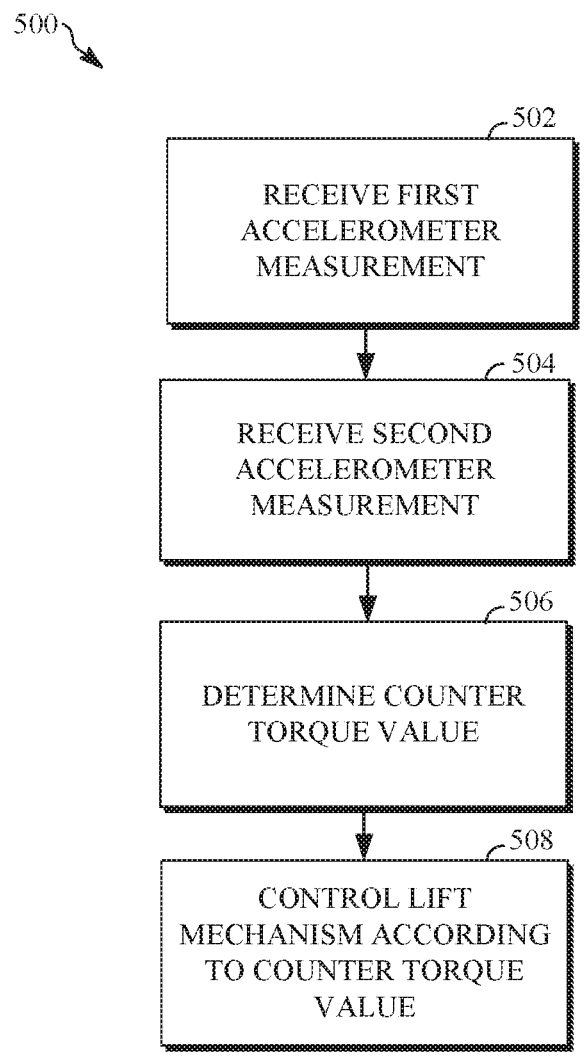
FIG. 5 generally illustrates a vibration cancellation method according to the principles of the present disclosure.

FIG. 5 is a flow diagram generally illustrating a vibration cancellation method 500 according to the principles of the present disclosure. At 502, the method 500, receives a first accelerometer measurement. For example, the controller 18 may receive the first accelerometer measurement from one of the accelerometer 28' disposed on the helm pad 110 and the accelerometer 30' disposed on the hull 116.

At 504, the method 500 receives a second accelerometer measurement. For example, the controller 18 may receive the second accelerometer measurement from the other of the accelerometer 28' and the accelerometer 30'. At 506, the method 500 determines a counter torque value. For example, the controller 18 may determine the counter torque value based on the first accelerometer measurement and the second accelerometer measurement. In some embodiments, the controller 18 receives the operator preference, as described. The controller 18 may adjust the counter torque value or any determined torque value based on the operator preference.

At 508, the method 500 controls the lift mechanism according to the counter torque value. For example, the controller 18 controls the motor 16 using the counter torque value. As the motor 16 turns in response to the counter torque value, the gears of the gear box 20 actuate causing the link arm 22 to move. The movement of the link arm 22 causes the lift mechanism 26 to apply a force, corresponding to the counter torque value, on the helm pad 110. The force applied on the helm pad 110 may reduce or eliminate the perception by the operator of the vibrations acting on the helm pad 110.

In some embodiments, a system for cancelling helm deck vibration, the helm deck including a helm pad disposed in a portion of the helm deck between a helm seat and a helm. The system includes a motor in mechanical communication with a lift mechanism, the lift mechanism being configured to allow the helm pad to travel in a direction perpendicular to the helm deck. The system also includes a processor and a memory. The memory includes instructions that, when executed by the processor, cause the processor to: receive, from a first accelerometer, a first accelerometer measurement; receive, from a second accelerometer, a second accelerometer measurement; determine a counter torque value based on the first accelerometer measurement and the second accelerometer measurement; and selectively control the lift mechanism according to the counter torque value using the motor.

In some embodiments, the motor includes a brushless servo motor. In some embodiments, the first accelerometer is disposed on the helm pad. In some embodiments, the second accelerometer is disposed on a vessel hull associated with the helm pad. In some embodiments, the lift mechanism includes one or more control arms adapted to apply a force corresponding to the counter torque value on the helm pad. In some embodiments, the instructions further cause the processor to selectively adjust the counter torque value based on an operator preference. In some embodiments, the operator preference corresponds to a desired operating style of an operator. In some embodiments, the system also includes one or more passive damping mechanisms configured to engage the helm pad.

In some embodiments, a method for cancelling vibration includes receiving, from a first accelerometer, a first accelerometer measurement; receiving, from a second accelerometer, a second accelerometer measurement; determining a counter torque value based on the first accelerometer measurement and the second accelerometer measurement; and selectively controlling a lift mechanism according to the counter torque value using a motor, the motor being in mechanical communication with the lift mechanism and the lift mechanism being configured to allow a platform to travel in one of a first direction and a second direction.

In some embodiments, the motor includes a brushless servo motor. In some embodiments, the first accelerometer is disposed on the platform. In some embodiments, the second accelerometer is disposed on a well associated with the platform. In some embodiments, the lift mechanism includes one or more control arms adapted to apply a force corresponding to the counter torque value on the platform. In some embodiments, the method also includes selectively adjusting the counter torque value based on an operator preference. In some embodiments, the operator preference corresponds to a desired operating style of an operator. In some embodiments, the method also includes engaging the platform using one or more passive damping mechanisms.

In some embodiments, a vibration cancellation apparatus includes a brushless servo motor in mechanical communication with a lift mechanism, the lift mechanism being configured to allow a helm pad to travel in a direction perpendicular to a helm deck. The apparatus also includes a first accelerometer disposed on the helm pad and configured to measure acceleration of the helm pad and a second accelerometer disposed on a vessel hull associated with the helm pad configured to measure acceleration of the vessel hull. The apparatus also includes a controller configured to: receive, from the first accelerometer, a first accelerometer measurement; receive, from the second accelerometer, a second accelerometer measurement; determine a counter torque value based on the first accelerometer measurement and the second accelerometer measurement; and selectively control the lift mechanism according to the counter torque value using the brushless servo motor.

In some embodiments, the controller is further configured to selectively adjust the counter torque value based on an operator preference. In some embodiments, the operator preference corresponds to a desired operating style of an operator. In some embodiments, the apparatus also includes one or more passive damping mechanisms configured to engage the helm pad.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A system for cancelling helm deck vibration, the helm deck including a helm pad disposed between a helm seat and a helm, the system comprising:
   a motor in mechanical communication with a lift mechanism, the lift mechanism being configured to allow the helm pad to travel in a direction perpendicular to the helm deck;
   a processor; and
   a memory that includes instructions that, when executed by the processor, cause the processor to:
      receive, from a first accelerometer, a first accelerometer measurement;
      receive, from a second accelerometer, a second accelerometer measurement;
      determine a counter torque value based on the first accelerometer measurement and the second accelerometer measurement; and
      selectively control the lift mechanism according to the counter torque value using the motor.

2. The system of claim 1, wherein the motor includes a brushless servo motor.

3. The system of claim 1, wherein the first accelerometer is disposed on the helm pad.

4. The system of claim 1, wherein the second accelerometer is disposed on a vessel hull associated with the helm pad.

5. The system of claim 1, wherein the lift mechanism includes one or more control arms adapted to apply a force corresponding to the counter torque value on the helm pad.

6. The system of claim 1, wherein the instructions further cause the processor to selectively adjust the counter torque value based on an operator preference.

7. The system of claim 6, wherein the operator preference corresponds to a desired operating style of an operator.

8. The system of claim 1, further comprising one or more passive damping mechanisms configured to engage the helm pad.

9. A method for cancelling vibration, the method comprising:
   receiving, from a first accelerometer, a first accelerometer measurement;
   receiving, from a second accelerometer, a second accelerometer measurement;

determining a counter torque value based on the first accelerometer measurement and the second accelerometer measurement; and selectively controlling a lift mechanism according to the counter torque value using a motor, the motor being in mechanical communication with the lift mechanism and the lift mechanism being configured to allow a platform to travel in one of a first direction and a second direction.

10. The method of claim 9, wherein the motor includes a brushless servo motor.

11. The method of claim 9, wherein the first accelerometer is disposed on the platform.

12. The method of claim 9, wherein the second accelerometer is disposed on a well associated with the platform.

13. The method of claim 9, wherein the lift mechanism includes one or more control arms adapted to apply a force corresponding to the counter torque value on the platform.

14. The method of claim 9, further comprising selectively adjusting the counter torque value based on an operator preference.

15. The method of claim 14, wherein the operator preference corresponds to a desired operating style of an operator.

16. The method of claim 9, further comprising engaging the platform using one or more passive damping mechanisms.

17. A vibration cancellation apparatus comprising:

a brushless servo motor in mechanical communication with a lift mechanism, the lift mechanism being configured to allow a helm pad to travel in a direction perpendicular to a helm deck;

a first accelerometer disposed on the helm pad and configured to measure acceleration of the helm pad;

a second accelerometer disposed on a vessel hull associated with the helm pad configured to measure acceleration of the vessel hull; and a controller configured to:
receive, from the first accelerometer, a first accelerometer measurement;

receive, from the second accelerometer, a second accelerometer measurement;

determine a counter torque value based on the first accelerometer measurement and the second accelerometer measurement; and selectively control the lift mechanism according to the counter torque value using the brushless servo motor.

18. The vibration cancellation apparatus of claim 17, wherein the controller is further configured to selectively adjust the counter torque value based on an operator preference.

19. The vibration cancellation apparatus of claim 18, wherein the operator preference corresponds to a desired operating style of an operator.

20. The vibration cancellation apparatus of claim 17, further comprising one or more passive damping mechanisms configured to engage the helm pad.

* * * * *